United States Patent
Dalal et al.

(10) Patent No.: US 9,792,431 B1
(45) Date of Patent: Oct. 17, 2017

(54) SYSTEMS AND METHODS FOR SELECTIVELY MASKING DATA ON VIRTUAL STORAGE DEVICES

(71) Applicant: Symantec Corporation, Mountain View, CA (US)

(72) Inventors: Chirag Dalal, Aundh (IN); Amitrajit Banerjee, Pimpale Saudagar (IN)

(73) Assignee: Veritas Technologies LLC, Mountain View, CA (US)

( * ) Notice: Subject to any disclaimer, the term of this patent is extended or adjusted under 35 U.S.C. 154(b) by 297 days.

(21) Appl. No.: 14/177,822

(22) Filed: Feb. 11, 2014

(51) Int. Cl.
*G06F 21/53* (2013.01)
*G06F 12/14* (2006.01)

(52) U.S. Cl.
CPC ............. *G06F 21/53* (2013.01); *G06F 12/14* (2013.01); *G06F 12/145* (2013.01); *G06F 12/1416* (2013.01); *G06F 12/1458* (2013.01)

(58) Field of Classification Search
CPC ............. G06F 12/14–12/1416; G06F 12/1458
USPC ........................................................ 711/163
See application file for complete search history.

(56) References Cited

U.S. PATENT DOCUMENTS

| | | | | |
|---|---|---|---|---|
| 8,010,763 B2* | 8/2011 | Armstrong | .......... | G06F 12/1475 711/153 |
| 8,341,733 B2* | 12/2012 | Craft | ....................... | G06F 9/468 380/259 |
| 2004/0015672 A1* | 1/2004 | Masse | ................... | G06F 3/0605 711/173 |
| 2006/0294298 A1* | 12/2006 | Peterson | ................. | G06F 21/80 711/112 |
| 2007/0055837 A1* | 3/2007 | Rajagopal | ........... | G06F 12/1475 711/163 |
| 2007/0250833 A1* | 10/2007 | Araujo | ................ | G06F 21/6218 718/1 |
| 2008/0082696 A1* | 4/2008 | Bestler | ................ | G06F 9/45533 709/250 |
| 2009/0070760 A1* | 3/2009 | Khatri | ................... | G06F 9/4856 718/1 |
| 2011/0010483 A1* | 1/2011 | Liljeberg | ............ | G06F 12/1441 711/6 |
| 2012/0304171 A1* | 11/2012 | Joshi | ................... | G06F 9/45558 718/1 |

OTHER PUBLICATIONS

"VMware", http://www.vmware.com/, as accessed Dec. 2, 2013, VMware, Inc., (Jan. 25, 1999).

(Continued)

*Primary Examiner* — Prasith Thammavong
(74) *Attorney, Agent, or Firm* — FisherBroyles LLP (57) ABSTRACT

A computer-implemented method for selectively masking data on virtual storage devices may include (1) identifying data stored on a virtual storage device that can be accessed by a virtual machine, (2) intercepting, from a process executing outside the virtual machine, an attempt by a process of the virtual machine to read the data, (3) determining that the virtual machine process is not authorized to read the data, and (4) in response to determining that the virtual machine process is not authorized to read the data, masking the data from the virtual machine process. Various other methods, systems, and computer-readable media are also disclosed.

20 Claims, 5 Drawing Sheets

(56) References Cited

OTHER PUBLICATIONS

"Atlantis ILIO Overview", http://www.atlantiscomputing.com/products/, as accessed Dec. 2, 2013, Atlantis Computing, Inc., (May 16, 2010).
"Atlantis ILIO Diskless VDI", http://www.atlantiscomputing.com/products/atlantis-ilio-diskless-vdi, as accessed Dec. 2, 2013, Atlantis Computing, Inc., (Dec. 2, 2013 or earlier).
"Cisco", http://www.cisco.com/c/en/us/products/servers-unified-computing/index.html, as accessed Dec. 2, 2013, (Dec. 2, 2013 or earlier).
"Atlantis Computing Products Overview", http://www.atlantiscomputing.com/products/overview, as accessed Dec. 2, 2013, Atlantis Computing, Inc., (Mar. 4, 2013).
"Windows", http://windows.microsoft.com/en-us/windows/home, as accessed Dec. 2, 2013, Microsoft, (Oct. 9, 2009).
Atlantis Computing, Inc., "Deployment Options", http://www.atlantiscomputing.com/products/deployment-options/, as accessed Dec. 2, 2013, (May 17, 2010).

\* cited by examiner

SYSTEMS AND METHODS FOR SELECTIVELY MASKING DATA ON VIRTUAL STORAGE DEVICES

BACKGROUND

The primary objective of computer security is to protect data from being accessed by those who are not authorized to access it. Data encryption, file ownership, access privileges are effective mechanisms against causal or inadvertent access by unauthorized users, but malware that is able to access data at the owner or highest (kernel or root) privilege can circumvent encryption or ownership schemes. Computing devices use filter drivers at the disk, volume, and file system levels to create and enforce data protection schemes, and similar approaches have been undertaken with virtual computing systems. Virtual storage systems provide additional challenges, however, since they lack the physical protections that can be employed with hardware-based storage.

The instant disclosure, therefore, identifies and addresses a need for improved systems and methods for selectively masking data on a virtual storage device.

SUMMARY

As will be described in greater detail below, the instant disclosure generally relates to systems and methods for selectively masking data on virtual storage devices by intercepting, from a process executing outside a virtual machine, attempts to read protected data, determining that the attempt to read the data is not authorized, and masking the data from the process attempting to read the data.

In one example, a computer-implemented method for selectively masking data on virtual storage devices may include (1) identifying data stored on a virtual storage device that can be accessed by a virtual machine, (2) intercepting, from a process executing outside the virtual machine, an attempt by a process of the virtual machine to read the data, (3) determining that the virtual machine process is not authorized to read the data, and (4) in response to determining that the virtual machine process is not authorized to read the data, masking the data from the virtual machine process.

In one embodiment, the process executing outside the virtual machine may be a module of a hypervisor. In some examples, determining that the virtual machine process is not authorized to read the data may include determining that the data is stored in a storage format that is not native to the virtual machine. In some examples, determining that the virtual machine process is not authorized to read the data may include determining that an owner of the virtual machine process is not an owner of the data.

In some examples, determining that the virtual machine process is not authorized to read the data may include determining that an owner of the virtual machine process is not a member of an organization that owns the data. In some examples, determining that the virtual machine process is not authorized to read the data may include determining that an owner of the virtual machine process is not included in a list of users authorized to read the data.

In some examples, masking the data from the virtual machine process may include reporting that the data could not be read. In some examples, masking the data from the virtual machine process may include reporting that the virtual machine process is not authorized to read the data. In some examples, masking the data from the virtual machine process may include providing modified data to the virtual machine process.

In one embodiment, a system for implementing the above-described method may include (1) an interception module that intercepts, from a process executing outside a virtual machine, an attempt by a process of the virtual machine to read the data, (2) a security module that determines that the virtual machine process is not authorized to read the data, (3) a masking module that, in response to determining that the virtual machine process is not authorized to read the data, masks the data from the virtual machine process, and (4) at least one processor configured to execute the identification module, the interception module, the security module, and the masking module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify data stored on a virtual storage device that can be accessed by a virtual machine, (2) intercept, from a process executing outside the virtual machine, an attempt by a process of the virtual machine to read the data, and (3) determine that the virtual machine process is not authorized to read the data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for selectively masking data on virtual storage devices. As will be explained in greater detail below, the systems and methods described herein may selectively mask data on virtual storage devices from users or processes not authorized to access the data. For example, corporate data may be blocked from view outside the corporate environment, personal data may be blocked from view by users other than the owner of the data, or virtual operating systems may be blocked from accessing data stored on virtual storage devices not in the virtual operating system's native storage format. Data may be masked by reporting that access to the data has been denied, by generating a read error, by providing modified data, or in any other suitable manner.

Figure 1:
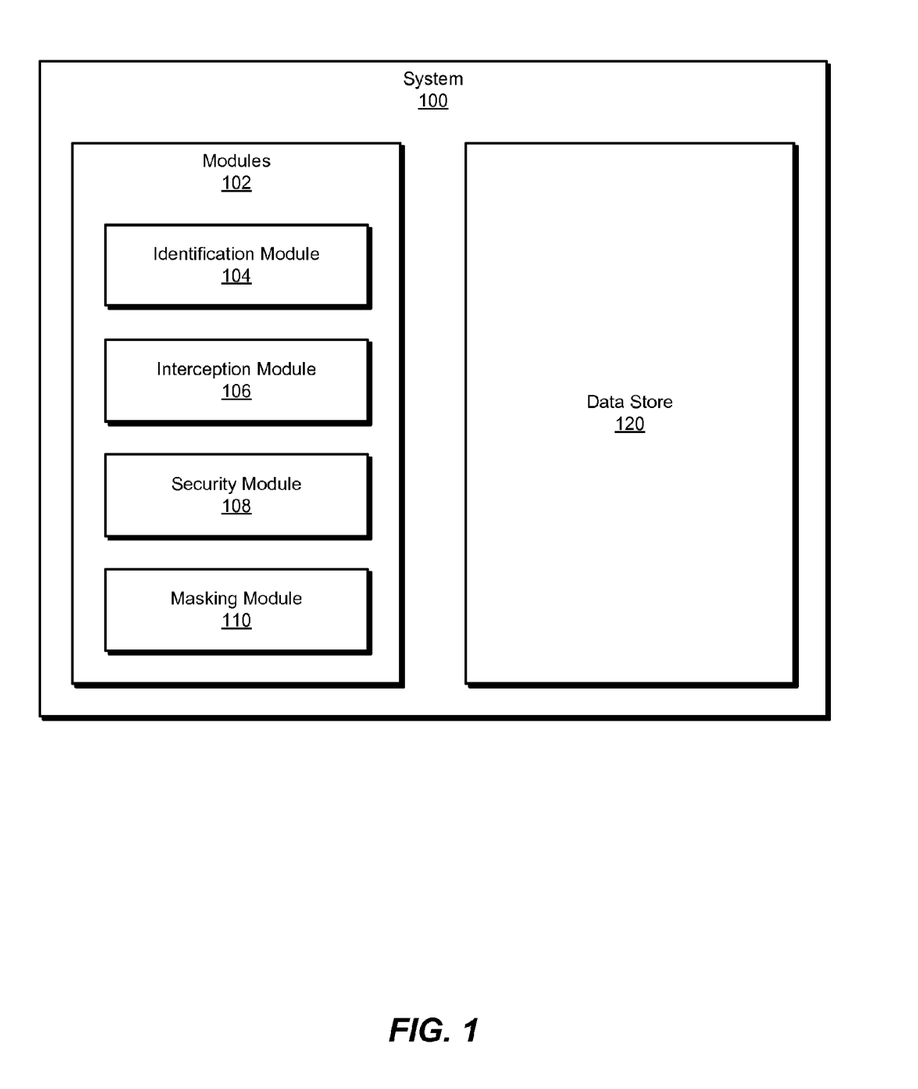
FIG. 1 is a block diagram of an exemplary system for selectively masking data on virtual storage devices.
Figure 2:
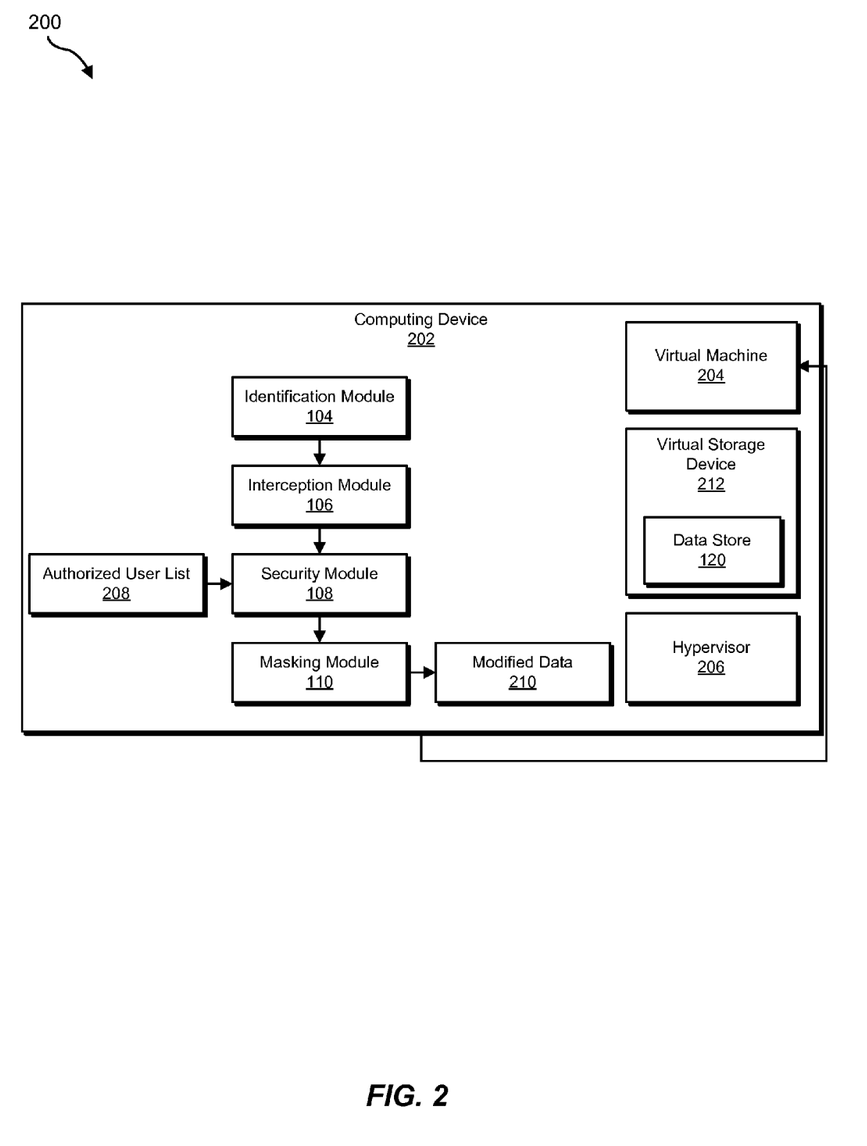
FIG. 2 is a block diagram of an additional exemplary system for selectively masking data on virtual storage devices.

The following will provide, with reference to FIGS. 1-2, detailed descriptions of exemplary systems for selectively masking data on virtual storage devices. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for selectively masking data on virtual storage devices. As illustrated in this figure, exemplary system 100 may include one or more modules 102 for performing one or more tasks. For example, and as will be explained in greater detail below, exemplary system 100 may include an identification module 104 that may identify data stored on a virtual storage device that can be accessed by a virtual machine. Exemplary system 100 may additionally include an interception module 106 that may intercept, from a process executing outside the virtual machine, an attempt by a process of the virtual machine to read the data. Exemplary system 100 may also include a security module 108 that may determine that the virtual machine process may be not authorized to read the data. Exemplary system 100 may also include a masking module 110 that may, in response to determining that the virtual machine process is not authorized to read the data, mask the data from the virtual machine process. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202, illustrated in FIG. 2, computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include one or more data stores, such as data store 120. In one example, data store 120 may be configured to store personal user data, data proprietary to an organization, or data, utility programs, or applications specific to an operating system.

Data store 120 may represent portions of a single database or computing device or a plurality of databases or computing devices. For example, data store 120 may represent a portion of computing system 410 in FIG. 4, and/or portions of exemplary network architecture 500 in FIG. 5. Alternatively, data store 120 in FIG. 1 may represent one or more physically separate devices capable of being accessed by a computing device, such as computing system 410 in FIG. 4, and/or portions of exemplary network architecture 500 in FIG. 5.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, computing device 202 may be programmed with one or more of modules 102 and/or may store all or a portion of the data in data store 120.

In one embodiment, one or more of modules 102 from FIG. 1 may, when executed by at least one processor of computing device 202, enable computing device 202 to selectively mask data on virtual storage devices. For example, and as will be described in greater detail below, one or more of modules 102 may be programmed to cause computing device 202 to identify data stored on a virtual storage device that can be accessed by a virtual machine. Interception module 106 may be programmed to intercept, from a process executing outside the virtual machine, an attempt by a process of the virtual machine to read the data. Security module 108 may be programmed to determine that the virtual machine process is not authorized to read the data. Masking module 110 may be programmed to, in response to determining that the virtual machine process is not authorized to read the data, mask the data from the virtual machine process.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 410 in FIG. 4, or any other suitable computing device.

Figure 3:
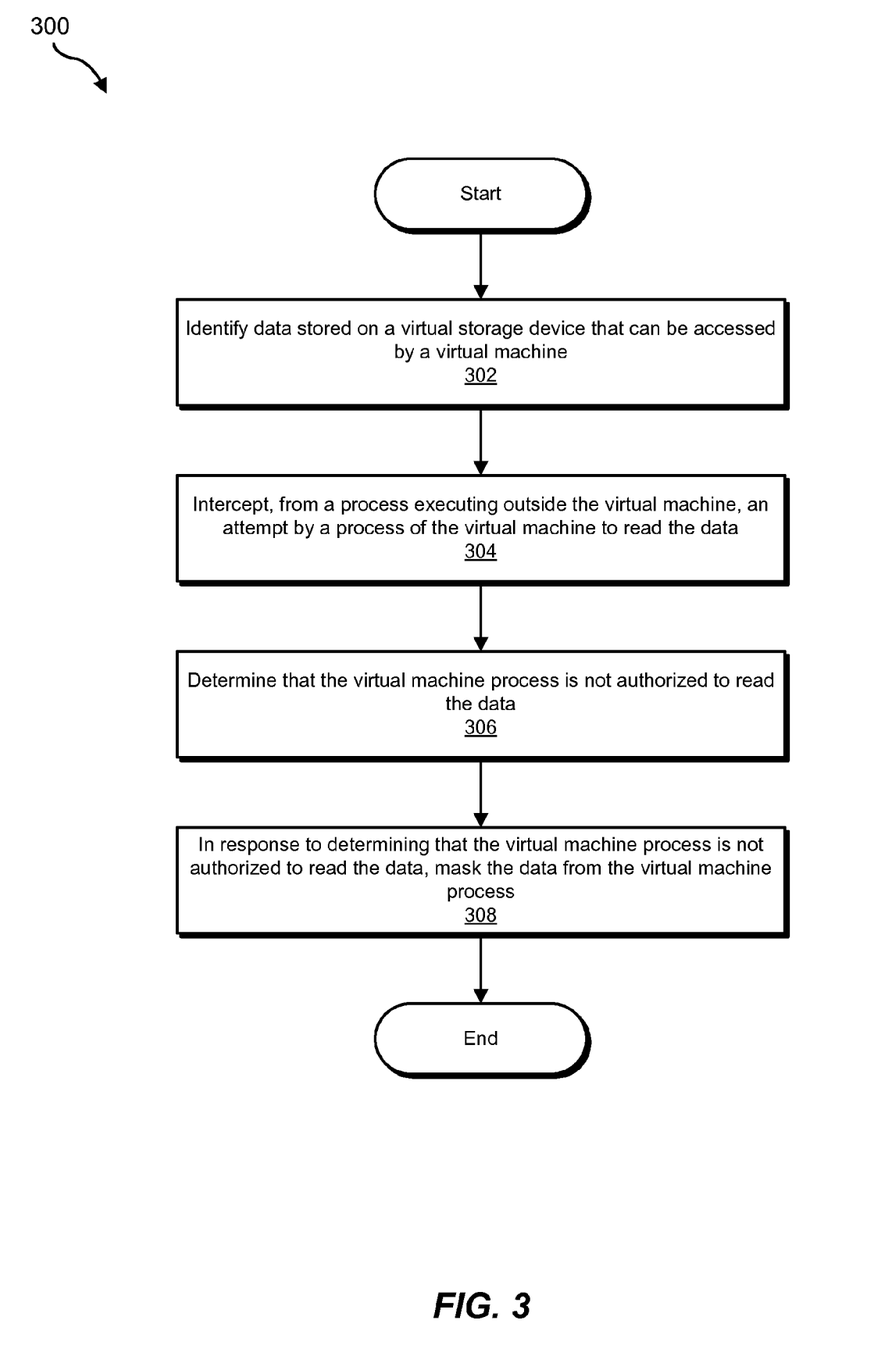
FIG. 3 is a flow diagram of an exemplary method for selectively masking data on virtual storage devices.

FIG. 3 is a flow diagram of an exemplary computer-implemented method 300 for selectively masking data on virtual storage devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 410 in FIG. 4, and/or portions of exemplary network architecture 500 in FIG. 5.

As illustrated in FIG. 3, at step 302 one or more of the systems described herein may identify data stored on a virtual storage device that can be accessed by a virtual machine. For example, at step 302 identification module 104 may, as part of computing device 202 in FIG. 2, identify data store 120, stored on virtual storage device 212 that can be accessed by virtual machine 204.

The phrase "virtual machine," as used herein, generally refers to any operating system environment that is abstracted from computing hardware by a virtual machine manager (e.g., a hypervisor). A virtual machine may provide a software abstraction of a physical machine and may provide a platform for running an operating system. Additionally or alternatively, a virtual machine may provide a platform for running one or more applications as processes, without a separate operating system executing on hardware.

The phrase "virtual storage device," as used herein, generally refers to a software abstraction of a physical storage device (e.g. an abstraction of a hard disk). A virtual storage device may map to physical storage capacity it represents. Virtual storage devices and systems may emulate physical hard disks by including a meta-data mapping table that translates the incoming virtual disk identifier and virtual LBA (Logical Block Addressing) to a physical disk identifier and physical LBA. Each virtual storage device may be stored as one or more files on a physical storage device in a file format specific to the virtual machine vendor. For example, VMWARE WORKSTATION virtual machines may use the VMDK file format. MICROSOFT HYPER-V may use the VHD file format.

The term "hypervisor," as used herein, generally refers to a program that creates and manages virtual machines. Hypervisors, sometimes referred to as virtual machine monitors (VMMs), are categorized into Type 1 hypervisors, such as VMWARE ESX/ESXI, CITRIX XENSERVER, and MICROSOFT HYPER-V, which interface directly with the hardware, and Type 2 hypervisors, such as SUN VIRTUALBOX, VMWARE SERVER, and MICROSOFT VIRTUAL PC, which interface with an underlying operating system.

The systems described herein may identify data stored on a virtual storage device that can be accessed by a virtual machine in a variety of ways. For example, identification module 104 may access settings for a virtual machine that map virtual storage devices to physical storage. CITRIX XENSERVER, for example, maintains an internal database of virtual machine settings, including virtual storage device configuration. A utility program is provided to extract configuration data to a plain text file. In another example, identification module 104 may be implemented as a module of a hypervisor, and thereby have access to the virtual storage configuration of a virtual machine through an Application Programming Interface (API).

Returning to FIG. 3, at step 304 one or more of the systems described herein may intercept, from a process executing outside the virtual machine, an attempt by a process of the virtual machine to read the data. For example, at step 304 interception module 106 may, as part of computing device 202 in FIG. 2, intercept, from a process executing outside virtual machine 204, an attempt by a process of virtual machine 204 to read data from data store 120 on virtual storage device 212.

Systems described herein may intercept an attempt by a process of the virtual machine to read protected data in various ways. For example, interception module 106 may be running as a process of computing device 202 with an elevated privilege level, equal to or greater than the virtual machine, and thereby have the ability to intercept read operations directed to the physical storage device containing the file representing the virtual storage device. Interception module 106 may use the virtual storage configuration obtained in step 302 to determine whether the virtual machine process is attempting to read data on a virtual storage device containing protected data. In one embodiment, the process executing outside the virtual machine is a module of a hypervisor that provides the ability to intercept attempts to read data from the virtual storage device via an API.

At step 306 of FIG. 3, one or more of the systems described herein may determine that the virtual machine process is not authorized to read the data. For example, at step 306, security module 108 may, as part of computing device 202 in FIG. 2, determine that a process of virtual machine 204 is not authorized to read data from data store 120 on virtual storage device 212.

Systems described herein may determine that a virtual machine process is not authorized to read protected data in a variety of ways. In some examples, determining that a virtual machine process is not authorized to read data may include determining that the data is stored in a storage format not native to the virtual machine. For example, security module 108 may determine that that a MICROSOFT HYPER-V virtual machine is attempting to load VMWARE TOOLS drivers from a VMWARE VMDK format virtual disk, or that a VMWARE ESX virtual machine is attempting to load MICROSOFT INTEGRATON COMPONENTS installed on a MICROSOFT VHD/VHDX format virtual disk.

In some examples, determining that the virtual machine process is not authorized to read the data may include determining that the owner of the virtual machine process is not the owner of the data, or that the owner of the virtual machine process is not a member of the organization that owns the data.

The phrases "process owner" and "data owner," as used herein, generally refer to a user designated as the owner of an executing process or data file under operating system permissions schemes. The owner of a process is typically the user who initiated execution of the process, and the owner of the file is typically the user who created the file. In either case, ownership can be transferred to another user.

The systems described herein may access data and process ownership and group membership attributes of the virtual machine operating system to enforce data privacy beyond the capabilities of the virtual machine operating system. For example, security module 108 may determine that a process executing on the virtual machine is attempting to access protected personal data not belonging to the owner of the process. Security module 108 may likewise protect propriety organizational data from being shown outside the organizational environment.

In some examples, determining that the virtual machine process is not authorized to read the data may include determining that the owner of the virtual machine process is not included in a list of users authorized to read the data. For example, as shown in FIG. 2, security module 108 may access authorized user list 208, which may list one or more users authorized to access data in data store 120 on virtual storage device 212. Authorized user list 208 may specify files, directories, databases, or other data storage structures which each user in the list is permitted to access. Security module 108 may access authorized user list 208 to determine that a process running on virtual machine 204 is attempting to read data from data store 120, and that the process is owned by a user not specified in authorized user list 208 as being allowed access to protected data.

In some embodiments, systems and methods described herein may selectively permit a virtual machine process to add data to a protected virtual storage device. For example, at step 304 of FIG. 3, interception module 106 may, as part of computing device 202 in FIG. 2, intercept an attempt by virtual machine 204 to store data in protected data store 120 on virtual storage device 212. Security module 108 may determine, based upon the source of the data, the owner of the process attempting to add the data, or by the data file contents, that the data may be added to the protected virtual storage device. Selectively adding data to a protected virtual storage device may be useful when adding software components, such as drivers, for hardware with a virtual machine, or when adding data, such as malware signatures for an anti-malware application.

Returning to FIG. 3, at step 308 one or more of the systems described herein may, in response to determining that the virtual machine process is not authorized to read the data, mask the data from the virtual machine process. For example, at step 308 masking module 110 may, as part of computing device 202 in FIG. 2, and in response to determining that a process of virtual machine 204 is not authorized to read data from data store 120 on virtual storage device 212, mask the data from the virtual machine process.

The phrase "data masking," as used herein, generally refers to obfuscating data elements within data stores. Data masking may be used to protect personally identifiable data, or proprietary personal or organizational data. Data masking may also be used to prevent data protected by one access control scheme from being accessed outside the operating system that controls access to the data.

Systems described herein may mask data from virtual machine processes not authorized to read the data in a variety of ways. For example, masking module 110 may mask the data from the virtual machine process by reporting that the data could not be read. The results of the attempted read operation would be reported to the virtual machine process as a read error, similar to a hardware read error on a physical disk. In some examples, masking the data from the virtual machine process may include reporting that the virtual machine process is not authorized to read the data. In this example, the results of the attempted read operation would be reported to the virtual machine process as a data access denied error. Some processes may recover more gracefully from an access denied error than a read error.

In some examples, masking the data from the virtual machine process may include providing modified data to the virtual machine process. Masking module 110 may employ any of a number of data masking techniques to provide modified data. For example, data substitution may preserve the authentic look of data records without disclosing the actual, protected data. Data substitution may be used when the owner of the data, for example, wants to provide authentic-looking data for testing purposes, while masking the actual data. In other examples, masking module 110 may employ data shuffling. Data shuffling is similar to data substitution, but it derives the substitution set from the same column of data that is being masked. As with data substitution, data shuffling may be used to maintain authenticity while masking the actual data. In a simple example, the values in a column of sales figures may be shuffled to obfuscate which customer is associated with which value, but still allowing an auditor to verify the sum of the values.

In another example, masking module 110 may provide contextually correct information to the virtual machine process without disclosing protected data. For example, if a virtual machine process requests metadata for a protected file, masking module 110 may provide modified, but contextually correct data to the virtual machine process, so that the calling process may continue to operate correctly without perceiving the protected data as lost or corrupted. For example, a virtual machine running the MICROSOFT NTFS file system may request metadata for a file on a protected virtual storage device. Masking module 110 may report the correct size and attributes for a file, but provide a modified file name, so as not to disclose the contents of the file. In another example where providing contextually correct information may be useful, the virtual storage device may contain more than one partition (e.g., virtual drives C: and D:).

When the operating system of the virtual machine attempts to read the partition table of the virtual storage device, masking module 110 may provide information about virtual drive C: but may provide empty entries in place of the partition data for virtual drive D:, effectively masking drive D: from the virtual machine.

In another example, masking module 110 may simply provide null values in place of the protected data. One of the drawbacks of data shuffling is that someone with some knowledge of the original data or who knows the shuffling algorithm may be able to reverse the shuffling process to determine the original values. By providing null values, no information is provided to indicate possible values of the original data. In another example, masking module 110 may employ field masking, in which all or part of sensitive data fields may be masked with substitute data. This technique is used with credit card or Social Security numbers, where only the last few digits of the number can be viewed by customer support personnel.

As explained above, the systems and methods described herein may selectively mask data on virtual storage devices by evaluating data access privileges from a higher privilege level than the processes of the virtual machine. A higher level of data protection can be provided against malware or malicious users, because data protection is provided at a higher privilege level than processes running in the virtual machine. In this way, there is no agent of the data protection method within the virtual machine to be attacked or circumvented. Sensitive data may be protected against inadvertent access by unauthorized users, and against access by malware or malicious users.

Figure 4:
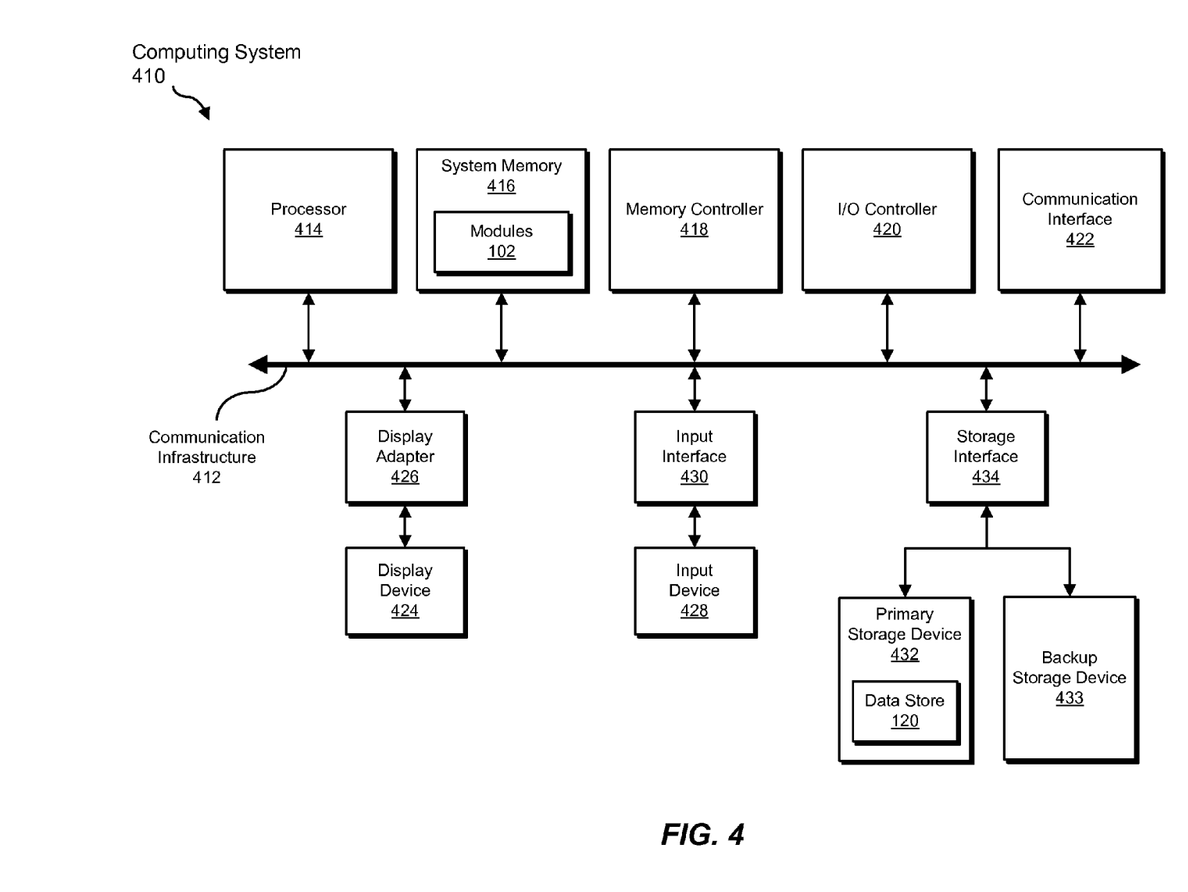
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. For example, all or a portion of computing system 410 may perform and/or be a means for performing, either alone or in combination with other elements, one or more of the steps described herein (such as one or more of the steps illustrated in FIG. 3). All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of physical processing unit (e.g., a hardware-implemented central processing unit) capable of processing data or interpreting and executing instructions. In certain embodiments, processor 414 may receive instructions from a software application or module. These instructions may cause processor 414 to perform the functions of one or more of the exemplary embodiments described and/or illustrated herein.

System memory 416 generally represents any type or form of volatile or non-volatile storage device or medium capable of storing data and/or other computer-readable instructions. Examples of system memory 416 include, without limitation, Random Access Memory (RAM), Read Only Memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410. In one example, data store 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an Application Specific Integrated Circuit (ASIC) adapted to implement one or more of the exemplary embodiments disclosed herein.

Figure 5:
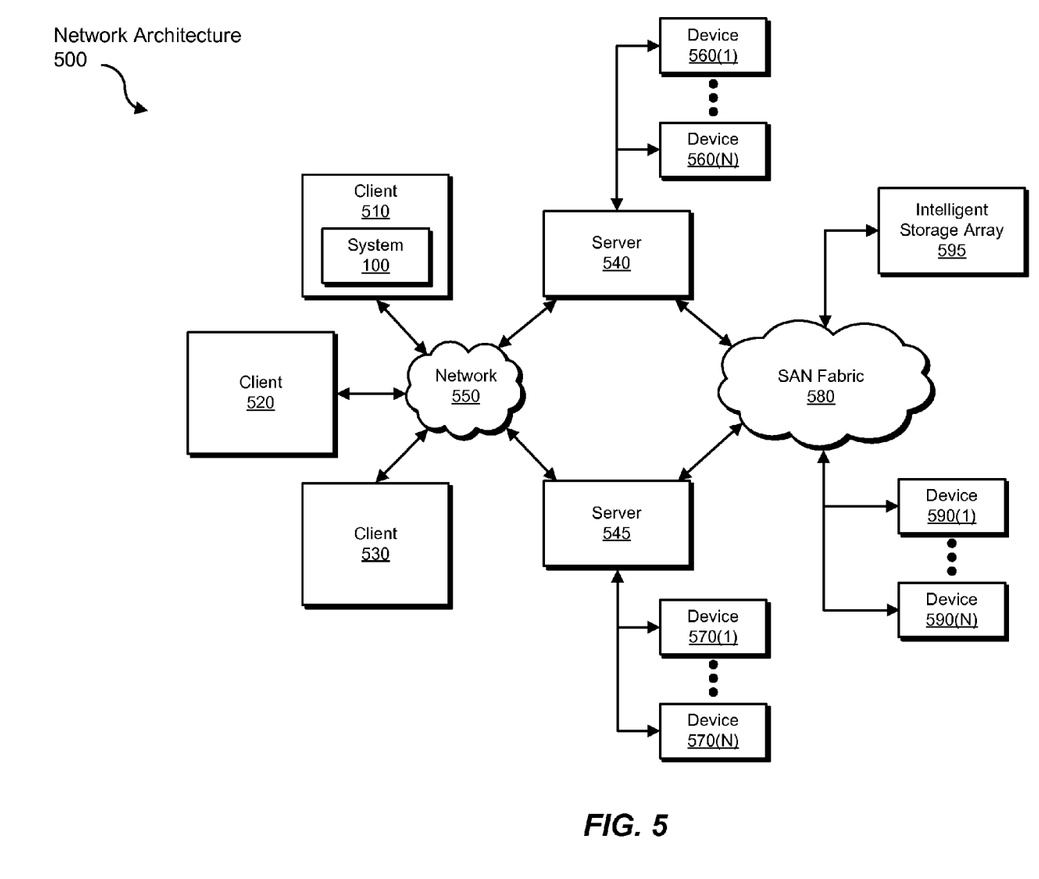
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the steps disclosed herein (such as one or more of the steps illustrated in FIG. 3). All or a portion of network architecture 500 may also be used to perform and/or be a means for performing other steps and features set forth in the instant disclosure.

Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a WAN, a LAN, a PAN, or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent Network-Attached Storage (NAS) devices configured to communicate with servers 540 and 545 using various protocols, such as Network File System (NFS), Server Message Block (SMB), or Common Internet File System (CIFS).

Servers 540 and 545 may also be connected to a Storage Area Network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network -based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an exemplary method for selectively masking data on virtual storage devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data to be transformed, transform the data, and/or output a result of the transformation to selectively mask data on a virtual storage device. Additionally or alternatively, one or more of the modules recited herein may transform volatile or non-volatile memory into a virtual storage device capable of selectively masking data. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for selectively masking data on virtual storage devices, at least a portion of the method being performed by a computing device comprising at least one processor, the method comprising:
   identifying data stored on a virtual storage device within a physical storage area that can be accessed by a virtual machine, wherein the virtual storage device comprises a non-protected partition and a protected partition;
   intercepting, from a process executing outside the virtual machine that has a higher privilege level than the processes of the virtual machine, an attempt by a process of the virtual machine to read the data that can be accessed by the virtual machine, wherein the attempt to read the data comprises an attempt to read a partition table of the virtual storage device;
   determining, based on an access-privilege evaluation performed by the process executing outside the virtual machine, that the virtual machine process attempting to read the data is not authorized to read the data; and
   in response to determining that the virtual machine process is not authorized to read the data, protecting the data from unprivileged access by masking the data from the virtual machine process, wherein masking the data comprises providing, to the virtual machine process, contextually correct information without disclosing protected elements of the data by providing, via the partition table, correct partition data for the non-protected partition while providing empty entries in place of correct partition data for the protected partition.

2. The computer-implemented method of claim 1, wherein the process executing outside the virtual machine comprises a module of a hypervisor.

3. The computer-implemented method of claim 1, wherein determining that the virtual machine process is not authorized to read the data comprises determining that the data is stored in a storage format that is not native to the virtual machine.

4. The computer-implemented method of claim 1, wherein determining that the virtual machine process is not authorized to read the data comprises determining that an owner of the virtual machine process is not an owner of the data.

5. The computer-implemented method of claim 1, wherein determining that the virtual machine process is not authorized to read the data comprises determining that an owner of the virtual machine process is not a member of an organization that owns the data.

6. The computer-implemented method of claim 1, wherein determining that the virtual machine process is not authorized to read the data comprises determining that an owner of the virtual machine process is not included in a list of users authorized to read the data.

7. The computer-implemented method of claim 1, wherein:
   the attempt by the virtual machine process to read the data comprises an attempt to read metadata for a file stored on the virtual storage device; and
   masking the data from the virtual machine comprises reporting the correct size and attributes for the file without disclosing the contents of the file.

8. The computer-implemented method of claim 1, wherein providing the empty entries for the protected partition comprises providing the empty entries such that the virtual machine process may continue to operate without perceiving the protected elements of the data as lost or corrupted.

9. The computer-implemented method of claim 1, wherein identifying the data that can be accessed by the virtual machine comprises accessing settings for the virtual machine that map the virtual storage device to physical storage.

10. A system for selectively masking data on virtual storage devices, the system comprising:
    an identification module, stored in memory, that identifies data stored on virtual storage within a physical storage area that can be accessed by a virtual machine, wherein the virtual storage device comprises a non-protected partition and a protected partition;
    an interception module, stored in memory, that intercepts, from a process executing outside the virtual machine that has a higher privilege level than the processes of the virtual machine, an attempt by a process of the virtual machine to read the data that can be accessed by the virtual machine, wherein the attempt to read the data comprises an attempt to read a partition table of the virtual storage device;
    a security module, stored in memory, that determines, based on an access-privilege evaluation performed by the process executing outside the virtual machine, that the virtual machine process attempting to read the data is not authorized to read the data;
    a masking module, stored in memory, that, in response to determining that the virtual machine process is not authorized to read the data, protects the data from unprivileged access by masking the data from the virtual machine process, wherein masking the data comprises providing, to the virtual machine process, contextually correct information without disclosing protected elements of the data by providing, via the partition table, correct partition data for the non-protected partition while providing empty entries in place of correct partition data for the protected partition; and
    at least one processor that executes the identification module, the interception module, the security module, and the masking module.

11. The system of claim 10, wherein the process executing outside the virtual machine comprises a module of a hypervisor.

12. The system of claim 10, wherein the security module determines that the virtual machine process is not authorized to read the data by determining that the data is stored in a storage format not native to the virtual machine.

13. The system of claim 10, wherein the security module determines that the virtual machine process is not authorized to read the data by determining that an owner of the virtual machine process is an the owner of the data.

14. The system of claim 10, wherein the security module determines that the virtual machine process is not authorized to read the data by determining that an owner of the virtual machine process is not a member of an organization that owns the data.

15. The system of claim 10, wherein the security module determines that the virtual machine process is not authorized to read the data by determining that an owner of the virtual machine process is not included in a list of users authorized to read the data.

16. The system of claim 10, wherein:
the attempt by the virtual machine process to read the data comprises an attempt to read metadata for a file stored on the virtual storage device; and
the masking module masks the data from the virtual machine by reporting the correct size and attributes for the file without disclosing the contents of the file.

17. The system of claim 10, wherein the masking module provides the empty entries for the protected partition by providing the empty entries such that the virtual machine process may continue to operate without perceiving the protected elements of the data as lost or corrupted.

18. The system of claim 10, wherein the identification module identifies the data that can be accessed by the virtual machine by accessing settings for the virtual machine that map the virtual storage device to physical storage.

19. A non-transitory computer-readable medium comprising one or more computer-executable instructions that, when executed by at least one processor of a computing device, cause the computing device to:

identify data stored on a virtual storage device within a physical storage area that can be accessed by a virtual machine, wherein the virtual storage device comprises a non-protected partition and a protected partition;

intercept, from a process executing outside the virtual machine that has a higher privilege level than the processes of the virtual machine, an attempt by a process of the virtual machine to read the data that can be accessed by the virtual machine, wherein the attempt to read the data comprises an attempt to read a partition table of the virtual storage device;

determine, based on an access-privilege evaluation performed by the process executing outside the virtual machine, that the virtual machine process attempting to read the data is not authorized to read the data; and in response to determining that the virtual machine process is not authorized to read the data, protect the data from unprivileged access by masking the data from the virtual machine process, wherein masking the data comprises providing, to the virtual machine process, contextually correct information without disclosing protected elements of the data by providing, via the partition table, correct partition data for the non-protected partition while providing empty entries in place of correct partition data for the protected partition.

20. The non-transitory computer-readable medium of claim 19, wherein the process executing outside the virtual machine comprises a module of a hypervisor.

* * * * *

UNITED STATES PATENT AND TRADEMARK OFFICE
CERTIFICATE OF CORRECTION

PATENT NO. : 9,792,431 B1  
APPLICATION NO. : 14/177822  
DATED : October 17, 2017  
INVENTOR(S) : Dalal et al.

Page 1 of 1

It is certified that error appears in the above-identified patent and that said Letters Patent is hereby corrected as shown below:

On the Title Page

In Item (72), under "Inventors", in Column 1, Line 2, delete "Pimpale Saudagar" and insert -- Pimple Saudagar --, therefor.

In the Claims

In Column 16, Line 67, in Claim 13, delete "is an the" and insert -- is the --, therefor.

Signed and Sealed this
Twenty-third Day of October, 2018

Andrei Iancu
*Director of the United States Patent and Trademark Office*